(No Model.)
H. HAINES.
TRAY.
No. 537,682. Patented Apr. 16, 1895.
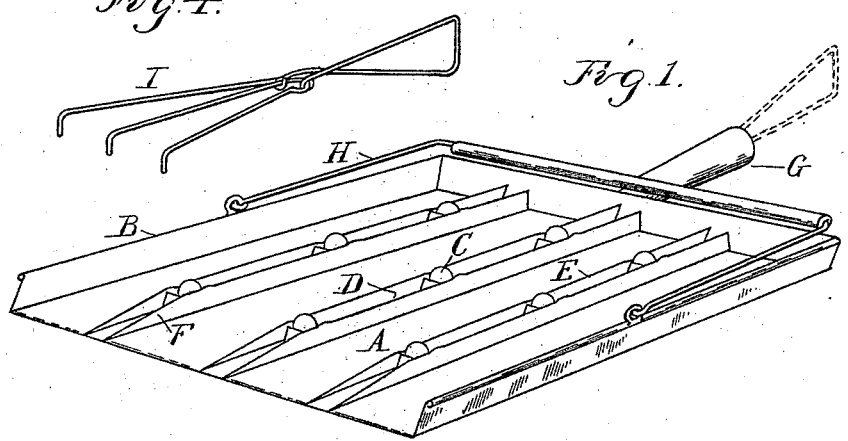
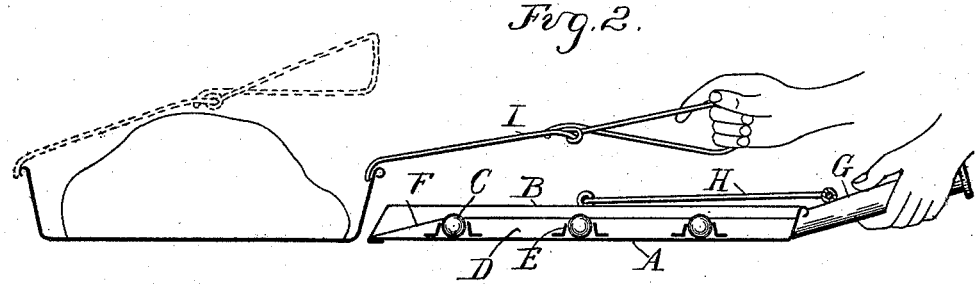
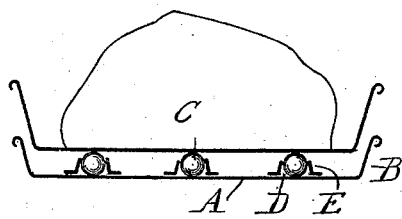
Witnesses
A. L. Happy
L. J. Whittemore
Inventor
Henry Haines
By
Att'ys.

UNITED STATES PATENT OFFICE.

HENRY HAINES, OF TOLEDO, OHIO.

TRAY.

SPECIFICATION forming part of Letters Patent No. 537,682, dated April 16, 1895.

Application filed November 6, 1894. Serial No. 528,021. (No model.)

*To all whom it may concern:*

Be it known that I, HENRY HAINES, a citizen of the United States, residing at Toledo, in the county of Lucas and State of Ohio, have invented certain new and useful Improvements in Culinary Utensils or Trays, of which the following is a specification, reference being had therein to the accompanying drawings.

This invention relates more specifically to a tray for placing hot pans or vessels thereon in removing them from the oven or stove, and the invention consists in the peculiar construction whereby it forms a convenient means for transferring hot pans or dishes from the oven onto the tray without burning the hands and which permits of setting it down without injury to a table, or a table covering, all as more fully hereinafter described and shown in the accompanying drawings, in which—

Figure 1 is a perspective view of my device. Fig. 2 is a vertical longitudinal section showing it as in use. Fig. 3 is a cross section, with a pan supported thereon. Fig. 4 is a detached perspective view of the hook used in connection therewith.

A is the tray made preferably of sheet metal with a flat bottom and a standing flange B around three sides of it, while on the fourth side the bottom forms the edge of the tray, which edge may be suitably reinforced transversely by means of a bent-over flange or in any other suitable manner.

Upon the bottom of the tray are placed a number of spherical bodies C of stone or any other poor heat conductor. These bodies may be secured to the tray, but preferably I place them into grooves D which are formed between metal strips E secured to the bottom of the tray. These strips which have beveled front ends F hold the spherical bodies between them in any manner to keep them at suitable distances apart and prevent them from falling out. This may be simply accomplished by narrowing the grooves on the opposite sides of the spherical bodies, as by pressing the flanges together, and in thus securing them, they may be slightly moved in the grooves, or taken out, if desired to clean or wipe the tray.

At the rear side of the tray is a suitable handle G and preferably in addition a suitable bail H attached near the middle of the tray.

In connection with the tray a hook I is provided, which may be made of wire to form three hooked prongs connected to a loop forming the handle. By making the handle hollow this hook may be readily placed into the handle when not in use as shown in dotted lines in Fig. 1.

In practice the tray is held with its front end in proximity to the hot pan to be removed and by means of the hook it is pulled onto the tray.

The use of this utensil in the removal of baking or dripping pans from a hot oven not only saves time and promotes cleanliness but saves the hands from too close proximity to a heated stove or oven and danger from burning. Further the tray with its contents may be placed anywhere without danger of soiling or scorching anything and a roast can thus be placed directly on the dinner table. The spherical non-conductors support the hot pan out of contact with the tray and permit a circulation of air on the bottom, so that not enough heat could pass through to affect even the varnish on a table.

What I claim as my invention is—

1. A culinary utensil for the purpose described consisting of a portable tray provided with a series of independent movable heat non-conducting bodies formed of rigid material secured in the tray and adapted to support a pan or vessel out of heating contact with the tray, substantially as described.

2. In a culinary utensil for the purpose described, the combination of the tray formed of sheet metal with a flat bottom and standing flanges upon three sides, the metal strips E having beveled edges F, and the non-conductors of heat C secured between the metal strips F.

3. As a new article of manufacture, the combination of a tray formed of sheet metal with flanges upon three sides and provided with means for holding and carrying the tray, the metal strips E secured upon the bottom of the tray, the spherical bodies C secured between the metal strips and forming a support, all combined and arranged, substantially as and for the purpose described.

4. A culinary utensil for the purpose described consisting of a portable tray, a series of revoluble heat non-conducting bodies on the base of the tray, and means for retaining the bodies in position in the tray, substantially as described.

In testimony whereof I affix my signature in presence of two witnesses.

HENRY HAINES.

Witnesses:
 M. B. O'DOGHERTY,
 L. J. WHITTEMORE.